United States Patent Office 3,790,489
Patented Feb. 5, 1974

3,790,489
PAINT STRIPPING COMPOSITION
Robert H. Shoemaker, Royal Oak, and William G. Wood, Grosse Pointe Park, Mich., assignors to Kolene Corporation, Detroit, Mich.
No Drawing. Filed Dec. 1, 1971, Ser. No. 203,880
Int. Cl. C11d 7/54
U.S. Cl. 252—103    10 Claims

ABSTRACT OF THE DISCLOSURE

A paint stripping compound for use fused at elevated temperatures which has a caustic base of an alkali metal hydroxide, an alkali metal nitrate, an alkali metal chloride, a catalyst selected from the group of alkali metal permanganates, manganese dioxide and $Cr_2O_3$, and preferably an alkali metal carbonate. The compound is fused and maintained at temperature between 800 degrees F. and 900 degrees F. for stripping. Periodically the temperature is reduced to about 700 degrees F. for desludging. Preferably the material is provided as a uniform solid solution.

BACKGROUND OF THE INVENTION

This invention relates generally to the stripping of organic compounds from an article and more particularly to a composition and method for stripping organic base paint having inorganic pigments from surfaces at elevated temperatures.

There are many instances where it is desirable to strip paint from painted surfaces, and when the object from which paint is to be stripped will permit, it is normally faster to perform the stripping at elevated temperatures in fused inorganic "salts." One common material for such stripping is a mixture of sodium hydroxide and sodium nitrate maintained at temperatures of the order of magnitude of 800 to 900 degrees F. This composition readily attacks the organic base of the paint converting it to carbon dioxide, thus removing the paint from the surface. However, if the paint contains an inorganic pigment or other inorganic material this inorganic material tends to become distributed through the fused "salt" as fine suspended particles and unless these particles are removed effectively, the efficiency of the bath is progressively impaired until a point is reached where the bath is no longer effective.

SUMMARY OF THE INVENTION

According to the present invention an improved composition and method of using the same is provided for stripping paint in which the bath forms a sludge and sludge can be settled to the bottom carrying with it the fine particles of inorganic material. The sludge is then removed periodically, allowing the bath to continue to function thus not requiring the disposal of the entire stripping bath. The composition is formed of an alkali metal hydroxide (preferably sodium hydroxide or a mixture of sodium and potassium hydroxide); an alkali metal nitrate (preferably sodium nitrate); an alkali metal chloride (preferably sodium chloride); and a catalyst selected from the group of alkali metal permanganates, $Cr_2O_3$, $MnO_2$. The composition also preferably contains an alkali metal carbonate (preferably sodium carbonate). Also the invention contemplates forming the composition as a uniform solid solution of the material.

DESCRIPTION OF THE PREFERRED EMBODIMENTS

According to the present invention stripping of paints is accomplished in a fused "salt" composition comprising a free alkaline material selected from a group consisting of alkali metal hydroxides and mixtures of alkali metal hydroxides and alkali metal carbonates, the carbonates not exceeding about 20% of the composition; an alkali metal nitrate, the ratio of the free alkaline material to the alkali metal nitrate being between 4 to 1 and 1 to 1; an effective amount up to about 2% of a catalyst selected from the group consisting of alkali metal permanganates, manganese dioxide and $Cr_2O_3$; and an effective amount up to about 15% by weight of an alkali metal chloride. (All percentages herein are weight percentages.) The material is fused into a bath and maintained at a temperature in excess of 800 degrees F., preferably approximately 800–900 degrees F. At this temperature the carbon in the paint reacts with the alkali metal nitrate to form carbon dioxide plus an alkali metal nitrite. The carbon dioxide then reacts with the alkali metal hydroxide to form an alkali metal carbonate plus water. The alkali metal nitrite formed reacts with oxygen from the ambient atmosphere (or supplied by bubbling oxygen or air through the baths) to form an alkali metal nitrate. The alkali metal permanganate or the $MnO_2$ or the $Cr_2O_3$ act as catalysts for the reaction of the oxygen and are not themselves acting as oxidizing agents but merely catalysts.

The stripping of the paint in reaction of the alkali metal nitrate with the carbon of the organic material of the paint leaves any inorganic material contained in the paint, principally as pigment, suspended as fine particles in the bath. In order to have a continuously operating bath which will not progressively degrade over a period of time, it is necessary to remove these suspended particles from the bath. This removal is accomplished by a desludging operation. The desludging operation is a process in which the variation of the solubility of alkali metal carbonate in the bath at different temperatures is utilized to precipitate the sodium carbonate out as a sludge carrying with it the suspended inorganic particles.

The solubility of the alkali metal carbonate in the fused bath varies directly as the temperature of the bath. At a temperature around 900 degrees F. the solubility of the alkali metal carbonate is of the order of magnitude of about 20% whereas at a temperature of 700 degrees F. the solubility of the alkali metal carbonate is of the order of magnitude of about 13%. Thus the bath is operated in its normal operating range of between 800 and 900 degrees F. for a period of time until the percentage of the alkali metal carbonate in the bath approaches the maximum solubility limit. The temperature of the bath is then lowered to below 840 degrees F., preferably around 700 degrees F. which will cause the excess sodium carbonate to precipitate as a sludge. This precipitation of the alkali metal carbonate as a sludge will carry with it the fine inorganic particles suspended within the bath. The sludge can then be removed and the temperature of the bath raised. This cycle is then repeated thereby allowing the bath to continue to operate over a long period of time, the desludging taking place periodically as required. Thus the entire bath need not be discarded but rather merely make up "salt" is added as necessary due to "drag out" or the utilization of the various components of the bath.

The alkali metal chloride, preferably sodium chloride, is added as a constituent to aid in the desludging process in that it tends to aid or help the settling out or precipitation of the carbonates and the suspended pigment particles. Of course other alkali metal chlorides such as potassium could be used, but sodium is preferred because it is cheaper. The exact reason for such helping or aid is not known but it may be some type of reaction which affects the solubility or ionization of either the sludge or the bath or both.

The exact composition of the bath can vary within rather broad limits. For example, the caustic base is present in a range from about 32% to about 47% of the composition. This caustic base preferably is either sodium hydroxide or a mixture of sodium and potassium hydroxide with the potassium hydroxide not exceeding the sodium hydroxide and up to a maximum of about 20% in the mixture. It is especially desirable to have a mixture of potassium and sodium hydroxide which forms a low melting eutectic thus producing a thinner bath during the desludging period when the temperature is lowered to around 700 degrees F. However, an excess of potassium hydroxide over sodium hydroxide or more than 20% potassium hydroxide is not desirable since it has a much stronger propensity to attack the container, especially in dominant amounts or amounts greater than about 20%.

Alkali metal carbonate, preferably sodium carbonate can be added in the initial charge to the bath and preferably should be included in an amount of about 12–13%. This allows a starting point at essentially the maximum solubility of the carbonate at desludging temperatures and any formation of a carbonate thereafter will be precipitated during subsequent desludgings, precipitating therewith the suspended inorganic material. However, if no alkali metal carbonate is added initially it will form by the reaction of the $CO_2$ with the alkali metal hydroxide. However, this will require a certain amount of time to build up the carbonate to its maximum solubility at the desludging point; all the while the inorganic materials are building up also. Thus during the first few desludging operations an inordinant amount of inorganic material has to be precipitated out. Of course potassium carbonate or other alkali metal carbonate could be used but sodium carbonate is cheaper and therefore is preferred.

As pointed out above, the ratio of the free alkaline material (i.e. the caustic base and alkali metal carbonate) to the total alkali metal nitrate should be between 4 to 1 and 1 to 1. The reason this ratio should be at least 1 to 1 is to enhance the stripping and removal characteristics of paints which are highly pigmented with inorganic material. Such paints have tended to leave a residue if ratio of the free alkaline material to the alkali metal nitrate is less than 1. Further, if the amount of alkali metal nitrate exceeds about 50% of the bath there is a propensity toward explosions which causes a definite safety hazard. However, this ratio should not exceed about 4 to 1 in order to provide sufficient alkali metal nitrate for the reaction with the carbon in the paint.

Preferably the alkali metal permanganate, $MnO_2$, $Cr_2O_3$ catalyst should be present in an amount at least of about ½% and in any case should not exceed the solubility of these materials in the bath which in each case is about 2% since the excess will precipitate out. While less than ½% will have some effect and in fact any measurable amount will have some effect, this effect will increase with an increase in the catalyst up to a point. Even more preferably these catalysts should be present in amounts of about 1 to 1½% which will provide maximum effect without exceeding the solubility limit.

With respect to the sodium chloride this also will provide some effect in aiding in the desludging with any measurable amount. However, it should not exceed about 15% which is the solubility of the chloride in the baths. The maximum effectiveness of this material is achieved between about 2 and 12%.

A preferable composition range for a "salt," according to this invention, is as follows:

| Material: | Percent by weight |
|---|---|
| Caustic base (sodium hydroxide and mixtures of potassium hydroxide and sodium hydroxide of approximate equal parts or an excess of sodium hydroxide, up to a maximum of 20% of potassium hydroxide) | 32–47 |
| Sodium nitrate | 32–47 |
| Sodium chloride | 2–12 |
| Sodium carbonate | 12–13 |
| $MnO_2$ | 1–1½ |

A preferred specific composition is as follows:

| | Percent |
|---|---|
| Sodium hydroxide | 20 |
| Potassium hydroxide | 19 |
| Sodium nitrate | 37 |
| Sodium chloride | 10 |
| Manganese dioxide | 1 |
| Sodium carbonate | 13 |

A paint stripping bath formed of the above composition provides an excellent medium for stripping even highly pigmented paints and the desludging operation will effectively remove the suspended fine particles in the bath from the paint allowing a very long continuous use of the bath without deterioration due to suspended inorganic particles in the bath.

It has also been found that it is preferred to form the above composition both for initially starting a bath and for additives to existing baths as a fused and solidified uniform solid solution of the constituents thereof. To form such material the various constituents are selected in the desired ratio and are then heated to a temperature substantially above the temperature necessary to cause them to fuse into a uniform solution. Once the uniform solution has been achieved the liquid material is quickly cooled and flaked in a conventional manner through a conventional flaking machine. This will provide a flaked material, each flake of which is a uniform solid solution of the exact desired composition of the material to be utilized for the bath.

This uniform solid solution material is preferable for several reasons to a physical mixture of the various constituents. First, each particle of material added contains exactly the proper proportions of constituents minimizing the chance that an improper mixture of constituents will occur while making up the bath. Also, the particles are a uniform solid solution which will melt at a given specific temperature and not a mixture of particles which will start melting at various temperatures requiring then the dissolving of other of the particles to form the solution. By having a specific melting point the clear proper liquid solution is obtained immediately upon melting whereas a time relationship is required to completely dissolve all of the particles of the various constituents upon initial melting. Further, when uniform solid solution is added to an existing bath it will immediately go into solution in the proper amount. With a mixture of materials there is a possibility that there will be premature precipitating out of certain of the constituents if they do not get into solution properly during the dissolving period. This could result in an imbalance of materials. Also, such an addition could cause an improper sludge formation even at higher temperatures during dissolving period which could imbalance the bath and precipitate out certain materials which should not be precipitated out. Hence this form of material is desirable over a mixture of materials.

What is claimed is:

1. A composition for use in the fused condition for stripping paints having inorganic pigments from surfaces at elevated temperatures consisting essentially of a free alkaline material selected from a group consisting of sodium and potassium hydroxides and mixtures of sodium and potassium hydroxides, the potassium hydroxide when present not exceeding 20% by weight of the composition, and a material selected from the group of sodium and potassium carbonates, the carbonates not exceeding about 20% of the composition, a material selected from the group of sodium and potassium nitrate, the ratio of the free alkaline material to the metal nitrate being between 4 to 1 and 1 to 1; a catalyst selected from the group consisting of alkali metal permanganates, manganese dioxide and $Cr_2O_3$; and from about 2% to about 15% by weight of a material selected from the group of sodium and potassium chloride.

2. The composition as defined in claim 1 wherein there is from 2 to 12% of said metal chloride.

3. The composition as defined in claim 1 wherein the catalyst is $MnO_2$ present between ½% and 1½%.

4. The composition as defined in claim 1 wherein the catalyst is $Cr_2O_3$ present between ½% and 1½%.

5. The composition as defined in claim 1 wherein the catalyst is an alkali metal permanganate present between ½% and 1½%.

6. The composition as defined in claim 1 wherein said metal nitrate is sodium nitrate.

7. The composition as defined in claim 1 wherein said metal carbonate is sodium carbonate.

8. The composition as defined in claim 1 wherein there is from 32% to 47% of the metal hydroxide, from 32% to 47% sodium nitrate, 2% to 12% sodium chloride, 12% to 13% sodium carbonate, and 1% to 1½% manganese dioxide.

9. The composition as defined in claim 8 wherein there is about 13% sodium carbonate, 1% manganese dioxide, 10% sodium chloride, 37% sodium nitrate, 19% potassium hydroxide, and 20% sodium hydroxide.

10. The composition as defined in claim 1 wherein said composition is a uniform solid solution of said constituents.

References Cited
UNITED STATES PATENTS

| | | | |
|---|---|---|---|
| 2,567,456 | 9/1951 | Webster | 252—156 X |
| 2,630,393 | 3/1953 | Francis | 252—156 UX |
| 2,891,881 | 6/1959 | Jaffe | 252—156 |
| 2,760,927 | 8/1952 | Webster | 252—156 X |
| 2,655,481 | 10/1953 | Clingan | 252—156 X |

MAYER WEINBLATT, Primary Examiner

U.S. Cl. X.R.

134—2, 38; 252—156